US009816553B2

(12) United States Patent
Takaki et al.

(10) Patent No.: US 9,816,553 B2
(45) Date of Patent: Nov. 14, 2017

(54) COMPRESSOR HAVING BALANCE MECHANISM FOR A THRUST BEARING

(71) Applicant: Kobe Steel, Ltd., Kobe-shi (JP)

(72) Inventors: Shugo Takaki, Takasago (JP); Yoshinori Kurioka, Takasago (JP); Masahiro Tajima, Takasago (JP); Hisanori Gotou, Takasago (JP); Norio Kawaguchi, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 399 days.

(21) Appl. No.: 14/485,953

(22) Filed: Sep. 15, 2014

(65) Prior Publication Data

US 2015/0118092 A1    Apr. 30, 2015

(30) Foreign Application Priority Data

Oct. 25, 2013  (JP) .................. 2013-221710

(51) Int. Cl.
*F16C 32/06*   (2006.01)
*F04C 2/16*    (2006.01)
(Continued)

(52) U.S. Cl.
CPC ............ *F16C 32/0644* (2013.01); *F01C 1/16* (2013.01); *F01C 21/003* (2013.01); *F01C 21/102* (2013.01); *F04C 2/16* (2013.01); *F04C 15/0042* (2013.01); *F04C 29/0021* (2013.01); *F16C 17/04* (2013.01); *F16C 32/0692* (2013.01); *F04C 18/16* (2013.01); *F04C 18/28* (2013.01)

(58) Field of Classification Search
CPC .... F16C 17/04; F16C 32/0629; F16C 32/064; F16C 32/0644; F16C 32/0692; F04C 2/14; F04C 2/16; F04C 2/28; F04C 18/16; F04C 18/28
See application file for complete search history.

(56) References Cited

U.S. PATENT DOCUMENTS 2,813,761 A * 11/1957 Pilarczyk ................ F16C 17/04
                                                 384/311
5,411,388 A    5/1995 Soderlund
(Continued)

FOREIGN PATENT DOCUMENTS

JP    62-7901 A    1/1987
JP    62-18390 U   2/1987
(Continued)

OTHER PUBLICATIONS

Extended European Search Report dated Nov. 11, 2014 in the corresponding European Application No. 14183654.4.

*Primary Examiner* — Bryan Lettman
(74) *Attorney, Agent, or Firm* — Oblon, McClelland, Maier & Neustadt, L.L.P.

(57) ABSTRACT

In order to adapt a balance piston unit of a compressor to a high speed, and to extend a service life of the compressor, a screw compressor according to the present invention includes a screw rotor including a rotor shaft, a radial bearing, a thrust plate, a balance mechanism, which is a slide bearing, a lubrication oil supply flow passage for supplying a lubrication oil, and a working fluid supply flow passage for supplying a working fluid for pressing the balance mechanism toward the thrust plate so that a reverse thrust load acts on the thrust plate.

7 Claims, 5 Drawing Sheets

(51) Int. Cl.
- *F16C 17/04* (2006.01)
- *F01C 1/16* (2006.01)
- *F01C 21/00* (2006.01)
- *F01C 21/10* (2006.01)
- *F04C 29/00* (2006.01)
- *F04C 15/00* (2006.01)
- *F04C 18/28* (2006.01)
- *F04C 18/16* (2006.01)

(56) References Cited

U.S. PATENT DOCUMENTS

| | | | |
|---|---|---|---|
| 7,347,301 B2 * | 3/2008 | Sekiya | F04C 18/16 |
| | | | 184/6.16 |
| 2010/0209279 A1 | 8/2010 | Matsukuma | |
| 2010/0329916 A1 | 12/2010 | Yoshimura | |
| 2012/0148435 A1 * | 6/2012 | Takaki | F04C 18/086 |
| | | | 418/201.1 |

FOREIGN PATENT DOCUMENTS

| | | |
|---|---|---|
| JP | 2008-248829 A | 10/2008 |
| JP | 2009-103012 A | 5/2009 |
| JP | 2009-185696 A | 8/2009 |
| WO | WO 93/10333 A1 | 5/1993 |

* cited by examiner

COMPRESSOR HAVING BALANCE MECHANISM FOR A THRUST BEARING

BACKGROUND OF THE INVENTION

Field of the Invention

The present invention relates to a compressor.

Description of the Related Art

Conventionally, a screw compressor including a pair of screw rotors has been known. For example, Japanese Examined Utility Model Application Publication No. Sho 62-18390 discloses a compressor including a pair of screw rotors that have rotor shafts, a rolling bearing that receives the rotor shaft, a piston that supports the rolling bearing, and a working fluid supply flow passage that supplies a working fluid for pressing the piston toward the rolling bearing. The rolling bearing is in contact with the piston in an axial direction of the rotor shaft. In other words, the rolling bearing receives a load (radial load) in a radial direction acting on the rotor shaft as well as a load (thrust load) acting in the axial direction of the rotor shaft. The piston is in a shape of partitioning a rotor chamber which stores the rotor shafts and the rolling bearings and a cylinder chamber to which the working fluid is supplied from each other. The working fluid presses the piston so that a thrust load acting on the rolling bearing and an inverse thrust load act via the rolling bearing on the rotor shaft.

By the way, as the rotational speed increases, a quantity of oil stirred by a piston arranged in an oil bath increases, resulting in an increase in mechanical loss in a compressor having a balance piston structure. Moreover, it is difficult to extend the service life of the compressor by such a structure that the rotor shaft is supported by the rolling bearing as described in Japanese Examined Utility Model Application Publication No. Sho 62-18390.

SUMMARY OF THE INVENTION

It is an object of the present invention to adapt a balance piston unit of the compressor to a high speed, and to extend the service life of the compressor.

As means to achieve the above-mentioned object, a compressor according to the present invention includes a screw rotor that includes a rotor main unit, which is a screw, and rotor shafts which extend from both sides of the rotor main unit, radial bearings that are arranged on both sides of the rotor main unit, and receive radial loads of the rotor shaft, a thrust bearing that is located at one shaft portion of the rotor shaft, a thrust plate that is fixed to an end of the other shaft portion of the rotor shaft, a balance mechanism that reduces a thrust load acting on the thrust bearing, where the balance mechanism includes a slide bearing that presses the thrust plate via a lubricant between the slide bearing and the thrust plate, and a balance piston unit that presses the slide bearing toward the thrust plate by a pressure of a working fluid.

According to the present invention, the thrust plate is not directly supported by the working fluid, a power loss caused by stirring the working fluid can be reduced, and the balance piston unit of the compressor can be adapted to a high speed. Moreover, the thrust plate is supported by the slide bearing, and the slide bearing can thus extend the service life of the compressor than the rolling bearing.

In this case, the compressor preferably further includes a control unit that adjusts the pressure of the working fluid depending on a magnitude of the thrust load, thereby controlling a force to press the slide bearing by the balance piston unit.

An unnecessary pressing force by the balance mechanism can be reduced while an overload on the thrust bearing is prevented in this aspect.

The compressor preferably includes a lubricant supply flow passage that supplies a gap between the thrust plate and the slide bearing with the lubricant, where the control unit controls at least one of a flow rate and a pressure of the lubricant in the lubricant supply flow passage depending on the magnitude of the thrust load further in this case.

The quantity of the lubricant for the slide bearing can be reduced when the pressing force by the balance mechanism for the thrust plate is not necessary, and the stirring loss by the thrust plate can be restrained in this aspect.

Specifically, the control unit preferably decreases the pressure of the working fluid, and at least one of the flow rate and the pressure of the lubricant in the lubricant supply flow passage upon at least a startup.

In this aspect, the balance mechanism can be controlled more appropriately.

Moreover, preferably, the slide bearing includes a pad opposing the thrust plate, and the pad is configured so as to tilt following the thrust plate according to the present invention.

In this aspect, even if the thrust plate is tilted, the pad of the slide bearing follows the tilt, and a so-called partial contact which is a state where the thrust plate is contact with only a part of the pad of the slide bearing is restrained. Thus, the decrease in the service life of the slide bearing can further be restrained.

Moreover, the radial bearing is preferably a slide bearing according to the present invention.

The size of the radial bearing can be restrained, and the service life of the radial bearing can be extended in this aspect Moreover, the compressor according to the present invention includes a discharge pressure sensor that measures a discharge pressure of the compressor, and a suction pressure sensor that measures a suction pressure of the compressor, where the control unit uses a difference between a measurement value by the discharge pressure sensor and a measurement value by the suction pressure sensor as a value corresponding to the magnitude of the thrust load.

The balance piston unit of the compressor can be adapted to a high speed, and the service life can be extended according to the present invention as mentioned above.

DESCRIPTION OF THE PREFERRED EMBODIMENT

A description will now be given of a screw compressor according to an embodiment of the present invention referring to FIGS. 1 to 7.

Figure 1:
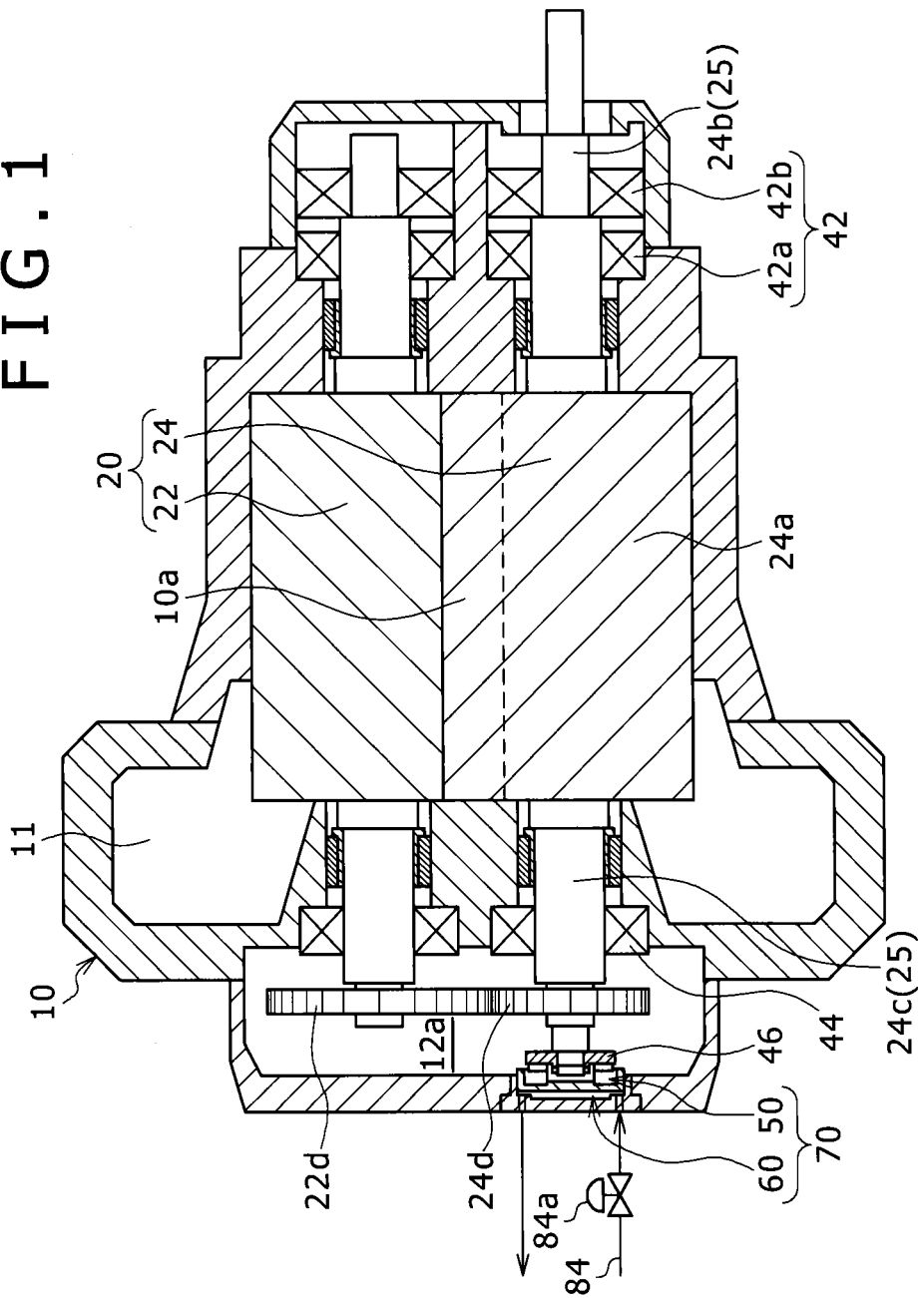
FIG. 1 is a diagram showing an overview of a configuration of a compressor according to an embodiment of the present invention.
Figure 2:
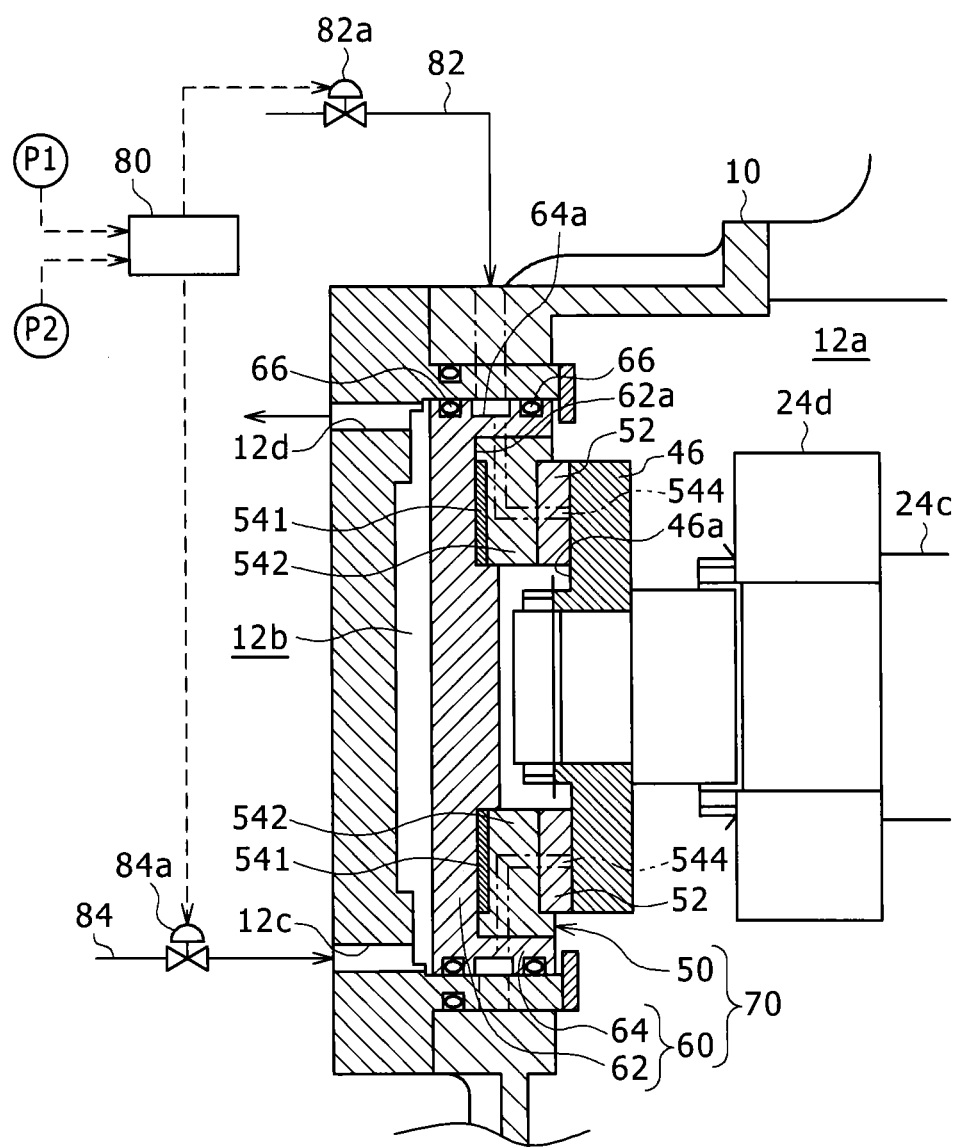
FIG. 2 is an enlarged view of a neighborhood of a balance mechanism of the compressor shown in FIG. 1.

As shown in FIGS. 1 to 2, the screw compressor according to this embodiment includes a casing 10, a pair of screw rotors 20 stored in the casing 10, a balance mechanism 70, a working fluid supply flow passage 84 connected to the casing 10, and a lubrication oil supply flow passage 82 connected to the casing 10 and a control unit 80 shown in FIG. 2. It should be noted that the lubrication oil supply flow passage 82 and the control unit 80 are omitted for illustration in FIG. 1.

The casing 10 includes a space capable of storing the pair of screw rotors 20 as shown in FIGS. 1 and 2. A compression space 10a formed between the pair of the screw rotors 20, a gear chamber 12a, and a fluid storage chamber 12b for storing the working fluid are provided in the casing 10. It should be noted that the fluid storage chamber 12b is also a part of the balance mechanism 70. The casing 10 includes a suction opening 11 for sucking the fluid into the compression space 10a, and a discharge opening (not shown) for discharging the fluid from the compression space 10a.

A pressure sensor P1 (not shown in FIG. 1) is provided on a discharge line connected to the discharge opening, which opens to the compression space, in the screw compressor, and the control unit 80 can read a detection value (discharge pressure) by the pressure sensor. Moreover, a pressure sensor P2 (not shown in FIG. 1) is provided on a suction line connected to the suction opening 11, which opens to the compression space, and the control unit 80 can read a detection value (suction pressure) by the pressure sensor.

A first valve 82a is provided on a lubrication oil supply flow passage 82, and a second valve 84a is provided on a working fluid supply flow passage 84. The control unit 80 adjusts the first valve 82a based on a pressure difference between the suction pressure and the discharge pressure, thereby controlling a flow rate (or pressure) of the lubrication oil in the lubrication oil supply flow passage 82 according to this embodiment. Similarly, the control unit 80 adjusts the second valve 84a provided on the working fluid supply flow passage 84 based on a pressure difference between the suction pressure and the discharge pressure, thereby controlling the pressure of the working fluid in the fluid storage chamber 12b. A load (radial load) in a radial direction and a load (thrust load) in an axial direction acting on a male rotor shaft 25 are changed by the pressure difference between the suction pressure and the discharge pressure as one of major causes in a drive state of the screw compressor.

The pair of screw rotors 20 shown in FIG. 1 include a female rotor 22 and the male rotor 24. The male rotor 24 rotates in a direction opposite to a rotational direction of the female rotor 22 while the male rotor 24 is meshing with the female rotor 22. The respective rotors 22 and 24 compress the fluid sucked from the suction opening 11 into the compression space 10a, and discharge the fluid from the discharge opening.

The male rotor 24 includes a rotor main unit 24a, which is a screw, a male rotor shaft 25, and a synchronizing gear 24d. The male rotor shaft 25 extends on both sides of the rotor main unit 24a. Hereinafter, a portion on the right side in FIG. 1 of the male rotor shaft 25 is referred to as "first shaft portion 24b", and a portion on the left side is referred to as "second shaft portion 24c". The first shaft portion 24b is connected to a motor, which is not shown. The synchronizing gear 24d is fixed to the second shaft portion 24c. A thrust plate 46 is fixed to an end portion of the second shaft portion 24c. The thrust plate 46 is in a disk shape including a flat plate surface 46a. The thrust plate 46 is fixed to the second shaft portion 24c in such an attitude that the plate surface 46a is orthogonal to the second shaft portion 24c, and rotates along with the male rotor shaft 25 according to this embodiment. The female rotor 22 has the same configuration as that of the male rotor 24 except for such a point that the thrust plate 46 is not provided, and includes a rotor main unit, which is a screw, a rotor shaft, and a synchronizing gear 22d fixed to the female rotor shaft. The synchronizing gear 24d of the male rotor 24, the synchronizing gear 22d of the female rotor 22, and the thrust plate 36 are stored in the gear chamber 12a in the screw compressor.

Radial bearings 42a and 44, which are slide bearings, are provided on the first shaft portion 24b and the second shaft portion 24c. The male rotor 24 is supported by the radial bearings 42a and 44 in a radial direction about the male rotor shaft 25 as the center (hereinafter, simply referred to as "radial direction"). Moreover, the thrust bearing 42b, which is a slide bearing, is provided on the first shaft portion 24b. The male rotor 24 is supported by the thrust bearing 42b in an axial direction of the male rotor shaft 25 (hereinafter, simply referred to as "axial direction").

The balance mechanism 70 includes a piston 60 (also referred to as "piston body"), a thrust bearing 50, which is a slide bearing of a tilting pad type, and a fluid storage chamber 12b as shown in FIGS. 1 and 2. The thrust bearing 50 axially opposes the thrust plate 46.

The fluid storage chamber 12b includes a supply opening 12c for supplying the working fluid, and a discharge opening 12d for discharging the working fluid from the fluid storage chamber 12b as shown in FIG. 2. The fluid storage chamber 12b stores the working fluid supplied from the working fluid supply flow passage 84 via the supply opening 12c. Oil is used as the working fluid according to this embodiment.

The piston 60 includes a partition portion 62 for partitioning the gear chamber 12a and the fluid storage chamber 12b from each other, and a ring-shaped portion 64.

The partition portion 62 includes an opposing surface opposing the inner peripheral surface of the casing 10 along the entire periphery thereof. A concave portion 62a in an annular shape recessed toward the fluid storage chamber 12b is formed on a surface on the thrust plate 46 side out of the partition portion 62.

The ring-shaped portion 64 is in such a shape as extending from a peripheral edge portion of the partition portion 62 toward the thrust plate 46 side in the axial direction. The ring-shaped portion 64 has such a shape that an outer peripheral surface thereof opposes the inner peripheral surface of the casing 10 along the entire periphery. A groove portion 64a is formed along the entire periphery on the outer peripheral surface of the ring-shaped portion 64. As a result, a space in a ring shape is formed between the casing 10 and the groove portion 64a. The lubrication oil is fed via an internal flow passage formed in the casing 10, and represented by long dashed double-short dashed lines from the lubrication oil supply flow passage 82 in the space in the ring shape, and the lubrication oil is supplied from the space to the thrust bearing 50.

O rings 66 are attached at two locations of the outer peripheral surface of the partition portion 62 and the outer peripheral surface of the ring-shaped portion 64, more specifically at two locations in the axial direction of the rotor shaft on both sides of the space (groove portion 64a) in the ring shape according to this embodiment. As a result, the working fluid supplied to the fluid storage chamber 12b is prevented from leaking to the gear chamber 12a.

The thrust bearing 50 is arranged inside the ring-shaped portion 64 of the piston 60. The piston 60 presses the thrust bearing 50 toward the thrust plate 46 by the working fluid supplied into the fluid storage chamber 12b. A balance piston unit for pressing the thrust bearing 50 toward the thrust plate 46 is formed by the fluid storage chamber 12b and the piston 60 in the balance mechanism 70 in this way. The thrust bearing 50 is axially in contact via an oil film with the thrust plate 46, and presses the thrust plate 46 from the suction opening side toward the discharge opening side of the screw compressor while rotatably supporting the thrust plate 46.

The thrust load acting on the thrust bearing 42b toward the thrust plate 46 shown in FIG. 1, namely, the thrust load from the discharge opening side toward the suction opening side can be reduced by providing the balance mechanism 70 in the screw compressor.

Figure 3:
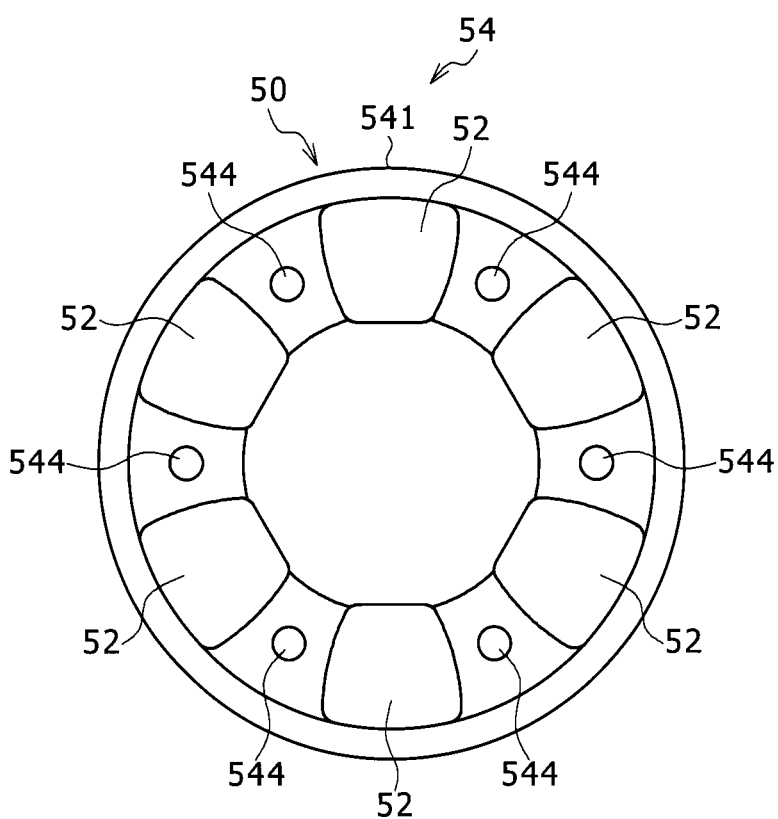
FIG. 3 is a plan view of a thrust bearing.

FIG. 3 is a plan view of the thrust bearing 50. The thrust bearing 50 includes a base portion 54 and a plurality of pads 52 arranged on the base portion 54. A nozzle portion 544 for supplying the lubrication oil is formed between the pads 52 neighboring each other. The nozzle portion 544 is connected via an inner flow passage of the thrust bearing 50 represented as long dashed double-short dashed lines, and inner flow passages in the groove portion 64a and the casing 10 represented as long dashed double-short dashed lines shown in FIG. 2 to the lubrication oil supply flow passage 82. The lubrication oil is supplied from the nozzle portions 544, thereby forming the oil film between the pads 52 and the thrust plate 46.

Figure 4:
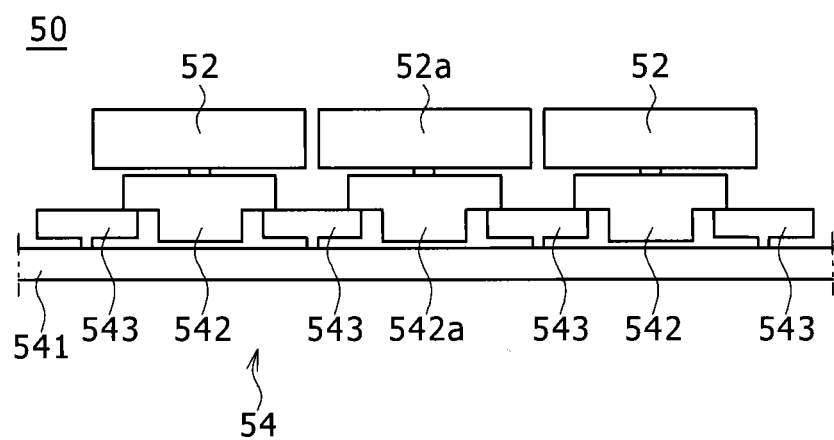
FIG. 4 is a development view describing a mechanism of the thrust bearing.

FIG. 4 is a part of a development view schematically showing an internal structure of the thrust bearing 50. The base portion 54 includes a base ring 541, and a plurality of lower members 543 and a plurality of upper members 542 arranged on the base ring 541. A side of the base ring 541, which is a lower side in FIG. 4, is simply referred to as lower side, and a side of the pads 52, which is an upper side in FIG. 4, is simply referred to as upper side hereinafter. The expressions of lower side and upper side do not need to match an upper side and a lower side in terms of the direction of the gravity.

The plurality of lower members 543 and the plurality of upper members 542 are arranged alternately in a circumferential direction, namely in a left/right direction in FIG. 4. The pad 52 is arranged on the upper member 542. Both end portions in the circumferential direction of the lower member 543 are respectively arranged on lower sides of end portions in the same direction of the neighboring upper members 542.

Figure 5:
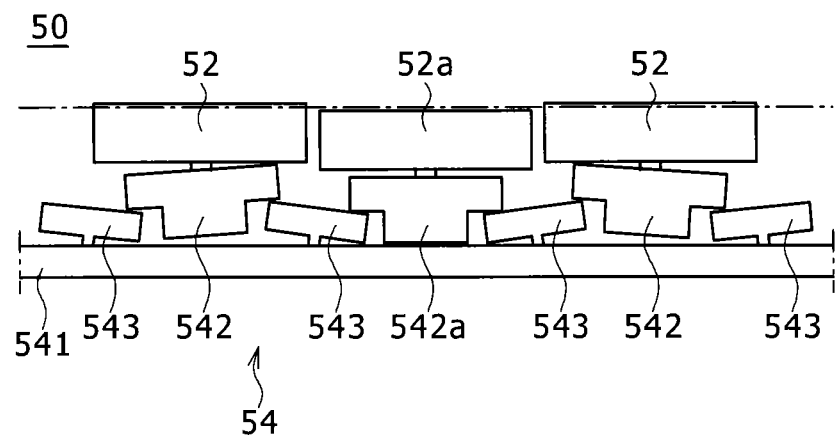
FIG. 5 is a development view describing the mechanism of the thrust bearing.

By the way, a load biased in the peripheral direction may be generated on the thrust bearing 50 by the thrust plate 46 in the screw compressor. FIG. 5 is a development view schematically showing the thrust bearing 50 in the state where the biased load is generated. A center pad 52 and a center upper member 542 in FIG. 5 are respectively referred to as "pad 52a" and "upper member 542a" hereinafter. A position in the axial direction of the pad 52a is represented by a long dashed double-short dashed line in FIG. 5. When the largest force acts on the pad 52a, the pad 52a and the upper member 542a located on the lower side of the pad 52a largely sink downward. The lower members 543 on both sides in the peripheral direction of the upper member 542a tilt about contact points between the lower members 543 and the base ring 541 so that portions on sides of the upper member 542a move downward. Other upper members 542 located on both sides of the upper member 542a receive forces directed upward by the lower members 543. As a result, the pads 52 located on both sides in the peripheral direction of the pad 52a are located slightly above the pad 52a.

The forces directing upward act on the pads 52 other than the pad 52a receiving the largest load in the thrust bearing 50 as a result of the tilts of the upper members 542 and the lower members 543, and the axial positions of the respective pads 52 are adjusted so as to follow the tilt of the thrust plate 46 in this way. The thrust bearing 50 is a self-leveling type which can adjust the axial positions of the pads 52, and a partial contact in which the thrust plate 46 comes in contact with only a part of the pads 52 is thus restrained. As a result, the thrust bearing 50 is prevented from being damaged.

Figure 6:
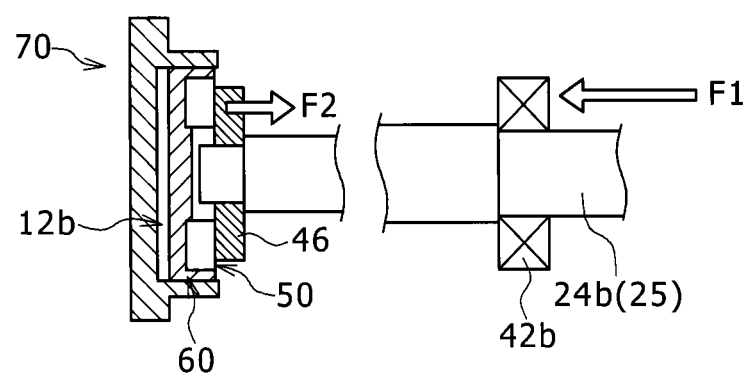
FIG. 6 is a view describing forces acting on the compressor.
Figure 7:
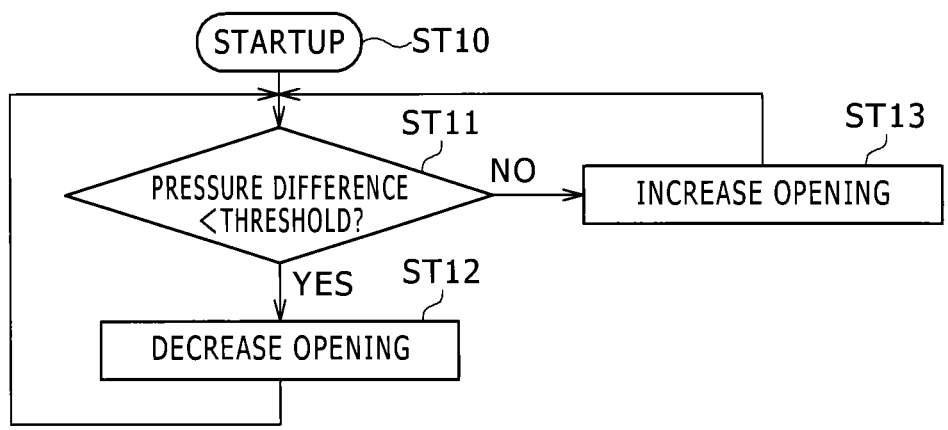
FIG. 7 is a flowchart showing an overview of an operation content of a control unit.

Referring to FIGS. 6 and 7, a description is now given of a drive operation of the screw compressor including an operation content of the control unit 80. It should be noted that FIG. 6 shows also forces acting on the screw compressor during the driving. A force F1 is a thrust load during a normal operation of the screw compressor, more strictly, a thrust load acting on the thrust bearing 42b if it is assumed that the pressure of the working fluid is not generated in the fluid storage chamber 12b. A force F2 is a force pressing the thrust plate 46 by the balance mechanism 70.

When the screw compressor is started up (Step ST10), the pair of screw rotors 20 shown in FIG. 1 rotate, and the fluid sucked from the suction opening 11 is compressed in the compression space 10a, and starts being discharge from the discharge opening. The pressure difference between the suction opening 11 and the discharge opening, which is a main cause for the generation of the thrust load, is sufficiently small upon the startup, and the thrust load applied to the male rotor shaft 25 is small. The pressure difference is smaller than a threshold defined in advance (Step ST11), and the control unit 80 thus decreases the openings of the first valve 82a and the second valve 84a (Step ST12). The supply of the working fluid is restrained by the second valve 84a, and the pressure of the working fluid is hardly generated in the fluid storage chamber 12b. As a result, the force F2 (refer to FIG. 2) is hardly generated, and the clearance is maintained by the oil film pressure between the thrust bearing 50 and the thrust plate 46. It should be noted that the second valve 84a may be fully closed. As a result, a power loss caused by a strong contact between the thrust plate 46 and the thrust bearing 50 can be reduced in the thrust bearing 50. Further, the opening of the first valve 82a is small, and the lubrication oil is thus restrained from being excessively supplied from the lubrication oil supply flow passage 82 to the thrust bearing 50, and the thrust plate 46 is prevented from stirring the lubrication oil. As a result, the power loss is reduced more in the thrust bearing 50.

When the screw compressor transitions to a normal operation, and the pressure difference exceeds the predetermined threshold (Step ST11), the control unit 80 increases the openings of the first valve 82a and the second valve 84a (step ST13), and the supplied amount of the lubrication oil from the lubrication oil supply flow passage 82 to the thrust bearing 50 and the supplied amount of the working fluid from the working fluid supply flow passage 84 to the fluid storage chamber 12b increase. The pressure of the working fluid increases in the fluid storage chamber 12b, the balance mechanism 70 shown in FIG. 6 presses the thrust plate 46, and the thrust load acting on the thrust bearing 42b becomes a value (F1−F2) acquired by subtracting the force F2 from the force F1. As a result, an overload on the thrust bearing 42b is prevented. Moreover, the lubrication oil is sufficiently supplied to the thrust bearing 50, and the oil film between the thrust bearing 50 and the thrust plate 46 can be secured. Then, the openings of the first valve 82*a* and the second valve 84*a* are adjusted depending on the magnitude of the pressure difference in the screw compressor.

Figure 8:
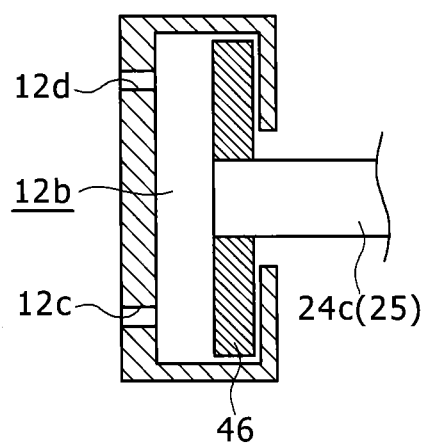
FIG. 8 is a view showing a comparative example for the compressor shown in FIG. 1.

A description has been given of the screw compressor according to the embodiment of the present invention, the thrust plate 46 is directly arranged in the fluid storage chamber 12*b* in a screw compressor according to a comparative example shown in FIG. 8, and the working fluid is stirred in the fluid storage chamber 12*b* as the thrust plate 46 rotates. Therefore, a resistance by the working fluid acting on the thrust plate 46 increases especially at a high rotation speed, resulting in an increase in a loss of the power. In contrast, the thrust plate 46 is pressed via the piston 60 in the screw compressor according to this embodiment, and the power loss caused by the working fluid being stirred can thus be reduced. As a result, the screw compressor can be operated at a higher speed than that in the comparative example in FIG. 8.

The thrust bearing 50 is the slide bearing, and the service life of the bearing can be extended compared with the case where the rolling bearing is used.

The pressure of the working fluid in the fluid storage chamber 12*b* is adjusted depending on the magnitude of the thrust load, the force of pressing the thrust bearing 50 by the balance piston unit is thus adjusted, and an unnecessary pressing force by the balance piston unit can be reduced while the overload on the thrust bearing 42*b* is prevented in the screw compressor according to this embodiment. Moreover, the flow rate (or pressure) of the lubrication oil is controlled in the lubrication oil supply flow passage 82 depending on the magnitude of the thrust load, and the loss of stirring the lubrication oil between the thrust plate 46 and the thrust bearing 50 can be restrained.

The radial bearing 44 is the slide bearing, and the service life of the radial bearing 44 is thus restrained from decreasing while an increase in the size of the radial bearing 44 in the radial direction is avoided compared with the rolling bearing.

A pressure receiving area is determined by the diameter of the thrust bearing 50 in the balance mechanism 70, and if the surface pressure applied to the thrust baring 50 and a temperature of the thrust bearing 50 permit, the size of the thrust bearing 50 can be reduced. As a result, a component cost and a required quantity of the lubrication oil can be reduced.

Since the pressure difference between the discharge side and the suction side is smaller in a state other than the startup such as a stop state in the screw compressor, the force of pressing the thrust bearing 50 by the balance piston unit may be reduced by decreasing the opening of the second valve 84*a*. Moreover, the quantity of the lubrication oil supplied to the thrust bearing 50 may be restrained by reducing the opening of the first valve 82*a*.

A description has been given of the embodiment of the present invention, and the embodiment disclosed herein should be considered to be an example in terms of all the points and not to be restrictive. The scope of the present invention is not represented by the above description but by the scope of claims, and connotation equivalent to the scope of claims, and all changes within the scope of claims are included.

The contact state between the thrust bearing 50 and the thrust plate 46 changes depending on the magnitude of the thrust load, and the temperature of the thrust bearing 50 changes accordingly in the screw compressor according to this embodiment. Therefore, the magnitude of the thrust load can be estimated by measuring the temperature of the thrust bearing 50, and the control unit 80 may carry out the opening/closing of the first valve 82*a* based on the temperature of the thrust bearing 50. Further, control of opening/closing the first valve 82*a* may be carried out based on the rotational speed of the screw compressor and an axial displacement quantity of the screw rotor 20. The same holds true for control of opening/closing the second valve 84*a*. The control of opening/closing the first valve 82*a* and the second valve 84*a* may be carried out based on various indices from which the magnitude of the thrust load can be estimated in this way. Of course, the thrust load may directly be measured. The control of opening/closing the first valve 82*a* and the control of opening/closing the second valve 84*a* may respectively be carried out at timings different from each other. Moreover, the opening of the first valve 82*a* may be continuously adjusted depending on the thrust load. The same holds true for the second valve 84*a*.

Though such an example that the thrust bearing 50 and the piston 60 are constructed independently is described in the embodiment, they may be constructed by an integrated member.

Other fluids such as a compression gas may be used as the working fluid supplied to the fluid storage chamber 12*b* in the embodiment. If a width in the radial direction of the radial bearing 44 permits, a ball bearing may be used as the radial bearing 44. A lubricant other than the lubrication oil may be used for the thrust bearing 50.

The balance mechanism 70 does not always need to be arranged on the suction side of the screw compressor, and may be arranged on the discharge side. Further, the balance mechanism 70 may be provided on the female rotor 22. The method of providing the balance mechanism 70 may be applied to a screw compressor in which a female rotor is driven, or a compressor of a single screw type.

What is claimed is:
1. A compressor comprising:
a screw rotor that includes a rotor main unit, which is a screw, and rotor shafts which extend from both sides of the rotor main unit;
radial bearings that are located on both sides of the rotor main unit, and receive a radial load of each respective rotor shaft;
a thrust bearing that is located at one shaft portion of the respective rotor shaft;
a thrust plate that is fixed to an end of another shaft portion of the respective rotor shaft;
a balance mechanism that reduces a thrust load acting on the thrust bearing, wherein the balance mechanism includes:
a slide bearing comprising an element having a face that directly presses the thrust plate via a lubricant present between the face of the slide bearing and the thrust plate;
a lubricant supply flow passage that extends to the face of the slide bearing that directly presses the thrust plate, and that supplies the lubricant to between the thrust plate and the face of the slide bearing; and
a balance piston unit that presses the slide bearing toward the thrust plate by a pressure of a working fluid,
wherein the lubricant supply flow passage has a portion extending in the interior of the slide bearing to the face of the slide bearing that directly presses the thrust plate.
2. The compressor according to claim 1, comprising a control unit that adjusts the pressure of the working fluid to the balance piston unit, depending on a magnitude of the thrust load, thereby controlling a force to press the slide bearing by the balance piston unit.

3. The compressor according to claim 2,
wherein the control unit controls at least one of a flow rate and a pressure of the lubricant in the lubricant supply flow passage depending on the magnitude of the thrust load.

4. The compressor according to claim 3, wherein the control unit decreases the pressure of the working fluid, and at least one of the flow rate and the pressure of the lubricant in the lubricant supply flow passage, upon a startup of the compressor.

5. The compressor according to claim 1, wherein:
the slide bearing includes a pad opposing the thrust plate; and
the pad is configured so as to tilt following the thrust plate.

6. The compressor according to claim 1, wherein the radial bearings are slide bearings.

7. The compressor according to claim 2, comprising:
a discharge pressure sensor that measures a discharge pressure of the compressor; and
a suction pressure sensor that measures a suction pressure of the compressor,
wherein the control unit uses a difference between a measurement value by the discharge pressure sensor and a measurement value by the suction pressure sensor as a value corresponding to the magnitude of the thrust load.

* * * * *